(12) United States Patent
Ho

(10) Patent No.: US 8,904,510 B2
(45) Date of Patent: Dec. 2, 2014

(54) AUTHENTICATING A USER FOR TESTING PURPOSES

(75) Inventor: Yan Yin Ho, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 13/551,117

(22) Filed: Jul. 17, 2012

(65) Prior Publication Data

US 2014/0026203 A1    Jan. 23, 2014

(51) Int. Cl.
*H04L 9/32* (2006.01)
*H04L 29/06* (2006.01)

(52) U.S. Cl.
CPC .............. *H04L 63/08* (2013.01); *H04L 63/168* (2013.01)
USPC .......................................................... 726/9

(58) Field of Classification Search
CPC ............................... H04L 63/08; H04L 63/168
USPC .......................................................... 726/9
See application file for complete search history.

(56) References Cited

U.S. PATENT DOCUMENTS

| | | | |
|---|---|---|---|
| 6,092,196 A | 7/2000 | Reiche | |
| 6,651,168 B1* | 11/2003 | Kao et al. | 713/185 |
| 7,117,529 B1 | 10/2006 | O'Donnell et al. | |
| 7,194,764 B2 | 3/2007 | Martherus et al. | |
| 7,428,750 B1* | 9/2008 | Dunn et al. | 726/8 |
| 8,136,148 B1 | 3/2012 | Chayanam et al. | |
| 2003/0200442 A1* | 10/2003 | Bhat et al. | 713/182 |
| 2006/0288085 A1* | 12/2006 | Alam et al. | 709/218 |
| 2007/0226785 A1 | 9/2007 | Chow et al. | |
| 2008/0072044 A1 | 3/2008 | Shah et al. | |
| 2012/0297468 A1* | 11/2012 | Bharadwaj Subramanya | 726/7 |
| 2012/0317630 A1* | 12/2012 | Goldberg | 726/7 |
| 2013/0061291 A1* | 3/2013 | Hegg et al. | 726/4 |

OTHER PUBLICATIONS

Aziz, et al., "Supporting HTTP Authentication and Forms Authentication in a Single ASP.NET Web Site", Published on: Apr. 2006, Available at: http://msdn.microsoft.com/en-us/library/aa479391.aspx.
"International Search Report & Written Opinion for PCT Patent Application No. PCT/US2013/050582", Mailed Date: Dec. 5, 2013, Filed Date: Jul. 16, 2013, 11 Pages. (MS# 336415.02).
Samar, Vipin, "Unified Login with Pluggable Authentication Modules (PAM)", In Proceedings of the 3rd ACM Conference on Computer and Communications Security, Mar. 14, 1996, pp. 1-10.
Scott, Alister, "Automatic Firefox Authentication When Using Selenium-WebDriver with AutoAuth", Published on: Jun. 27, 2012, Available at: http://watirmelon.com/2012/06/27/automatic-firefox-authentication-when-using-selenium-webdriver-with-autoauth/.

* cited by examiner

*Primary Examiner* — Kambiz Zand
*Assistant Examiner* — Aubrey Wyszynski
(74) *Attorney, Agent, or Firm* — Ben Tabor; Brian Haslam; Micky Minhas

(57) ABSTRACT

Authenticating a user for testing purposes. A web server receives a request from a client that includes an authentication credential and that is formatted to be handled by a particular authentication module. The authentication module is configured to obtain authentication tokens based on authentication credentials included in requests, while refraining from generating any interactive authentication dialog. Based on the request, the web server passes at least a portion of the request, including the authentication credential, to the authentication module. The authentication module determines that the request is formatted in a manner that triggers the authentication module. The authentication module obtains an authentication token from an identity provider based on the authentication credential, while refraining from generating any interactive authentication dialog. The authentication module returns the authentication token to the web server. The web server returns the authentication token to the client.

20 Claims, 2 Drawing Sheets

AUTHENTICATING A USER FOR TESTING PURPOSES

BACKGROUND

When developing software applications, developers may employ automated testing tools that exercise functionality of software applications with minimal or no user input from a human during the testing cycle. Automated testing tools may employ Application Programming Interfaces (APIs) provided by applications and operating systems to send commands to the software application being tested, in order to interact with the software application (e.g., to select menu options, to provide textual input, to press buttons, etc.). For example, when developing a web-based software application (web application), a developer may employ automated testing tools that utilize APIs of a web browser to interact with the web application. For example, automated testing tools may utilize web browser APIs to select Hypertext Markup Language (HTML) links, to interact with popup dialogue boxes, to provide textual input to text fields, etc.

Frequently, web applications include authentication mechanisms. For example, an e-mail web application may request user authentication before granting access to the e-mail web application. The request for user authentication may cause a web browser to display a popup authentication dialogue, which includes fields for a user to provide user credentials (e.g., username and password) and one or more buttons (e.g., for submitting the user credentials, for dismissing the dialogue, etc.). To authenticate, a user would typically provide user credentials and select a button for submitting the credentials, which would result in access to e-mail web application if the user credentials are valid. Accordingly, automated testing of web applications may involve dealing with authentication that involves use of popup authentication dialogues.

One way to perform authentication during automated testing involves providing a "back door" into the web application. For example, a developer may include functionality for accessing the web application in a manner that bypasses user authentication. However, since inclusion of back doors introduces a significant security risk, developers may include the back door only in a testing version of the web application. This means that the developer must maintain at least two separate versions of the web application, including the testing version and a "live" version. This also means that automated testing tools only test the testing version of the web application, and not the live version that is actually deployed.

Another way to perform authentication during automated testing is to include functionality in the automated testing tools for automatically supplying user credentials in any authentication dialogues that are displayed by a web browser. For example, an automated testing tool may be programmed to provide a particular username in a "username" field of an authentication dialogue, to provide a particular password in a "password" field of the dialogue, and to press an "ok" button of the dialogue. However, different web browsers display authentication dialogues in different ways. For example, an authentication dialogue from one web browser may include a "username" and a "password" field along with a "submit" and a "cancel" button, while an authentication dialogue from another web browser may include an "account name" and a "passphrase" field along with an "ok" and a "dismiss" button. In addition, different web browsers may provide different APIs for interacting with authentication dialogues. Each type of web browser may even change the way it presents authentication dialogues from version to version. As such, programming automated testing tools to automate use of authentication dialogues can be difficult, especially when supporting a broad range of web browsers and a large number of versions of the web browsers.

BRIEF SUMMARY

At least some embodiments described herein relate to authenticating a user for testing purposes. For example, embodiments may include triggering a web server authentication module that obtains authentication tokens based on user credentials, while refraining from generating any interactive authentication dialogue. As such, some embodiments can facilitate automated authentication during testing of web application code that is intended for deployment, while eliminating the need for authentication-related back doors.

In some embodiments, authenticating a user for testing purposes includes a web server receiving a request from a client. The request includes an authentication credential and is formatted in a particular manner for being handled by a particular authentication module that is registered with the web server. The authentication module is configured to obtain authentication tokens based on user credentials included in requests that are formatted in the particular manner, while refraining from requesting any interactive authentication dialogue. Based on the request, the web server consults a set of authentication modules that includes the authentication module. Consulting the set of authentication modules includes passing a portion of the request, including the authentication credential, to the authentication module. Based on consulting the set of authentication modules, the web server obtains an authentication token from the authentication module. The web server returns the authentication token to the client.

In other embodiments, authenticating a user for testing purposes includes an authentication module at a web server receiving a request to authenticate. The request is formatted in a particular manner that triggers the authentication module as opposed to other authentication modules at the web server. The authentication module determines that the request is formatted in the particular manner. Based on the determination, the authentication module extracts an authentication credential from the request. Based on the extracted authentication credential, the authentication module obtains an authentication token from an identity provider, while refraining from generating any interactive authentication dialogue. The authentication module returns the authentication token.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to authenticating a user for testing purposes. For example, embodiments may include triggering a web server authentication module that obtains authentication tokens based on user credentials, while refraining from generating any interactive authentication dialogue. As such, some embodiments can facilitate automated authentication during testing of web application code that is intended for deployment, while eliminating the need for authentication-related back doors.

Figure 1:
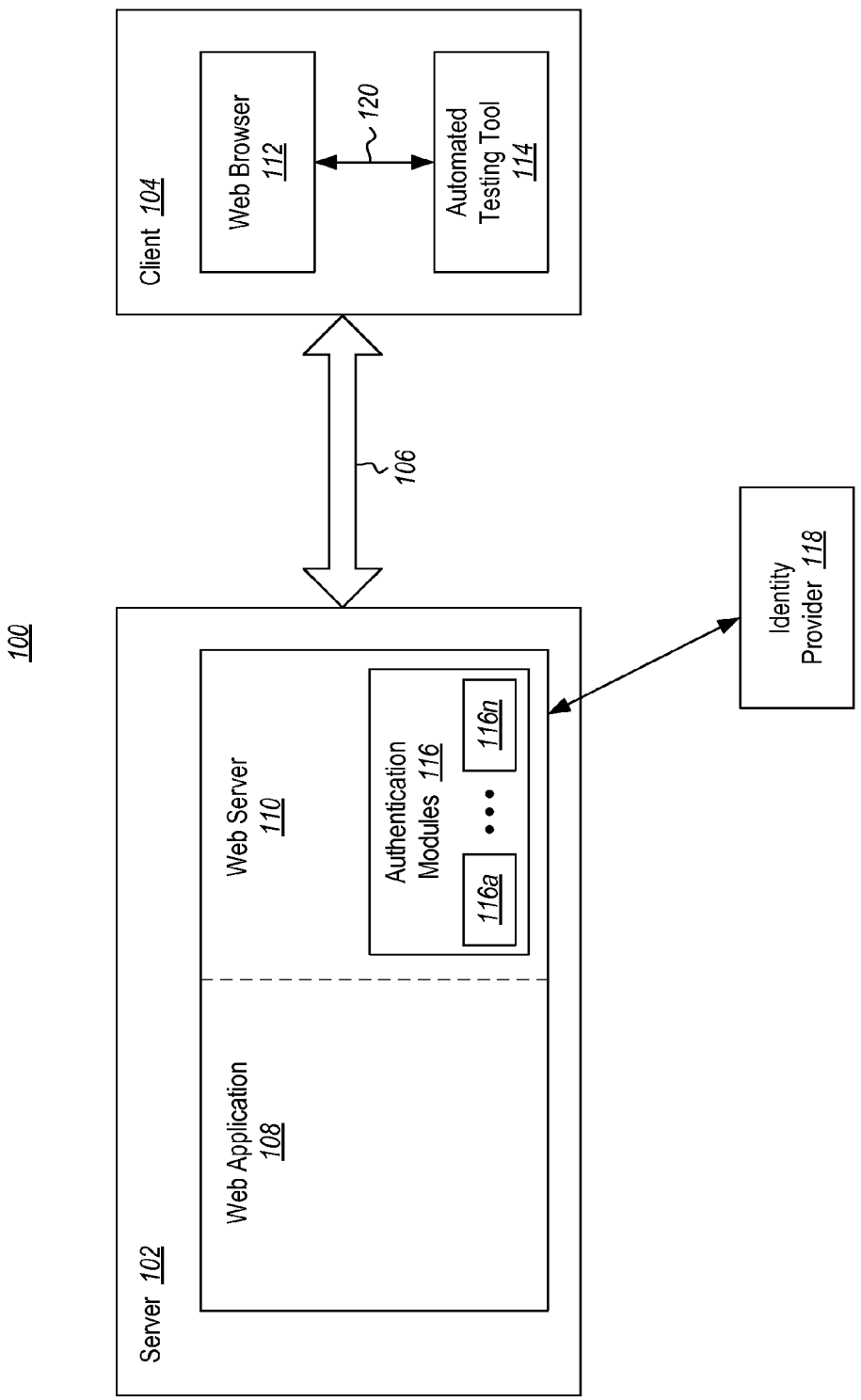
FIG. 1 illustrates an example computer architecture that facilitates authenticating a user for testing purposes.

FIG. 1 illustrates example computer architecture 100 that facilitates authenticating a user for testing purposes. Computer architecture 100 includes server 102 and client 104 that are connected via connection 106. Server 102 and client 104 may comprise physically separated computer systems, in which case connection 106 may comprise a network connection, such as a Local Area Network, a Wide Area Network, the Internet, and the like. Server 102 and client 104 may alternatively comprise the same physical hardware, in which case connection 106 may comprise a system bus, inter-process communication, a loopback network connection, etc. Combinations of the foregoing may also be possible.

Computer architecture 100 also includes identity provider 118 that is operably coupled to server 102. Identity provider 118 is configured to verify provided authentication credentials and to return authentication tokens when provided authentication credentials are valid. Identity provider 118 may be a service (e.g., a directory service), a database, an application, a module, etc. at server 102, or identity provider 118 may be a third party. Identity provider 118 can generate authentication tokens that are based on the authentication credentials that were provided to identity provider 118. For example, an authentication token may identify the authentication credential for which it was generated, an authentication credential may be used as a seed for generating an authentication token, etc.

Client 104 includes web browser 112 and automated testing tool 114, which are operably coupled to one another (as depicted by arrow 120). Web browser 112 may provide or otherwise expose a set of APIs to automated testing tool 114. Automated testing tool 114 may, in turn, use the APIs that are provided/exposed by web browser 112 to provide input to and otherwise control web browser 112. Automated testing tool 114 may also use the APIs that are provided/exposed by web browser 112 to receive data from web browser 112.

Automated testing tool 114 is configured to test functionality of web application 108 at server 102 by using web browser 112 to access web application 108 through one or more requests to web server 110. For example, using APIs exposed by web browser 112, automated testing tool 114 can use web browser 112 to initiate one or more requests to web server 110 (and, by extension, web application 108). In addition, using APIs exposed by web browser 112, automated testing tool 114 can analyze one or more responses received by web browser 112 from web server 110 (and, by extension, web application 108). For example, using web browser 112, automated testing tool 114 can select links and other graphical elements of web application 108 as presented by web browser 112, and can provide input to data fields of web application 108 as presented by web browser 112, etc.

Server 102 includes web server 110 which interoperates with and provides access to web application 108. Server 102 may comprise a singular physical server or a single virtual machine instance, in which case web application 108 and web server 110 are embodied together at the singular physical server or the single virtual machine instance. Server 102 may alternatively comprise a plurality of physical servers and/or a plurality of virtual machine instances, in which case web application 108 and web server 110 may each be embodied at different physical server(s) and/or virtual machine instance(s). In some embodiments, web application 108 and web server 110 are logically separated (e.g., web application 108 may include one or more modules that execute separate from web server 110). In some embodiments, web application 108 and web server 110 are at least partially integrated (e.g., web application 108 may include one or more modules that are loaded at and/or execute within web server 110).

Generally, web server 110 is configured to serve documents and other data to web browsers at clients, such as web browser 112 at client 104. More particularly, web server 110 is configured to expose documents and other data of web application 108 to the clients. For example, web server 110 may receive one or more requests from client 104. Based on the request(s), web server 110 may respond to client 104 with one or more documents or other data from web application 108. For example, a request from client 104 to web server 110 may comprise a HyperText Transport Protocol (HTTP) request relating to web application 108, and a response from web server 110 to client 104 may comprise a HTTP response containing documents or data relating to web application 108. The response may include one or more HyperText Markup Language (HTML) documents, eXtensible Markup Language (XML) documents, picture data, video data, and the like.

Web server 110 includes authentication modules 116 for performing authentication related to providing clients access to web application 108. For example, web application 108 may require that users/clients be authenticated before granting the users/clients access to all or part of the functionality of web application 108 (e.g., before granting access to one or more documents at web application 108). Authentication modules 116 includes a set of one or more modules that each perform authentication in a different manner based on requests from clients to access restricted functionality of web application 108. Each authentication module in the set may perform authentication using a different type of authentication technology. For example, authentication modules may include modules that perform authentication using Kerberos, NT LAN Manager (NTLM), digest, basic, etc. In some embodiments, web server 110 includes a prioritized order of authentication modules. In these embodiments, web server 110 tries to authenticate a request using each module, in turn, according to the prioritized order until an authentication module is encountered that is able to perform authentication for the request. In some embodiments, web server 110 negotiates with a requesting web browser to identify one or more of the authentication modules that are supported by both web server 110 and the requesting web browser.

Conventionally, authentication modules used by a web server cause an authentication dialogue to be generated at a requesting client. For example, in response to a request to access restricted functionality of a web application, a conventional authentication module may cause a web server to send a response to the requesting client. The response is conventionally configured to cause the requesting client to present an interactive authentication dialogue, which enables entry of an authentication credential at the client. After entry of the authentication credential at the authentication dialogue, the requesting client browser sends the authentication credential to web server for validation. When the conventional authentication module receives the authentication credential that was provided in the authentication dialogue, the conventional authentication module authenticates the credential using the particular technology implemented by the module. As such, conventional authentication modules require some form of interactivity at client to authenticate to a web application.

While authentication modules 116 may include one or more conventional authentication modules, computer architecture 100 enables automated authentication of a user for testing purposes by including a new type of authentication module that authenticates without causing an authentication dialogue to be generated. As depicted, authentication modules 116 includes authentication module 116a, which is registered at web server 110 and which is configured to authenticate a user without causing any visual authentication dialogue to be presented at the client. Authentication module 116a is configured to handle requests that are formatted in a particular manner and that include an authentication credential. For example, a particularly-formatted request may include a specially-formatted Uniform Resource Locator (URL) (e.g., a particular variable or a particular value in a query string), particular data in a cookie, particular data in a HTTP header, etc. In some embodiments, inclusion of an authentication credential causes the request to be formatted in the particular manner.

As such, automated testing tool 114 can be configured to leverage authentication module 116a to authenticate to web application 108 without encountering an authentication dialogue. For example, automated testing tool 114 may cause web browser 112 to send a request to access restricted functionality of web application 108 to web server 110. The request can be formatted in the particular manner, so that the request is authenticated by authentication module 116a as opposed to any other authentication module. For example, the request may include a particular variable or value in a URL, particular data in a cookie, or particular data in a HTTP header. The request can include an authentication credential. When web server 110 receives the request, web server can validate the request using authentication module 116a, as opposed to any other authentication module. In some embodiments, web server 110 tries each authentication module in a prioritized order, and authentication module 116a is the first authentication module in the prioritized order. In this embodiment, the request is handled by authentication module 116a and any subsequent modules in the list are skipped. In some embodiments, authentication module 116a is tried after other authentication modules have been unable to authenticate the request, because of the manner in which the request has been formatted.

As such, automated testing tool 114 can test web application 108 without coding any back door into web application 108 and while testing the actual code of web application 108 that is being deployed. Doing so also simplifies automated testing tool 114, since it does not have to adapt to varying APIs related to authentication dialogues. If desired, authentication module 116a can be registered at web server 110 only when web application 108 is being tested, and/or identity provider can authorize testing credentials only during a testing period.

Figure 2:
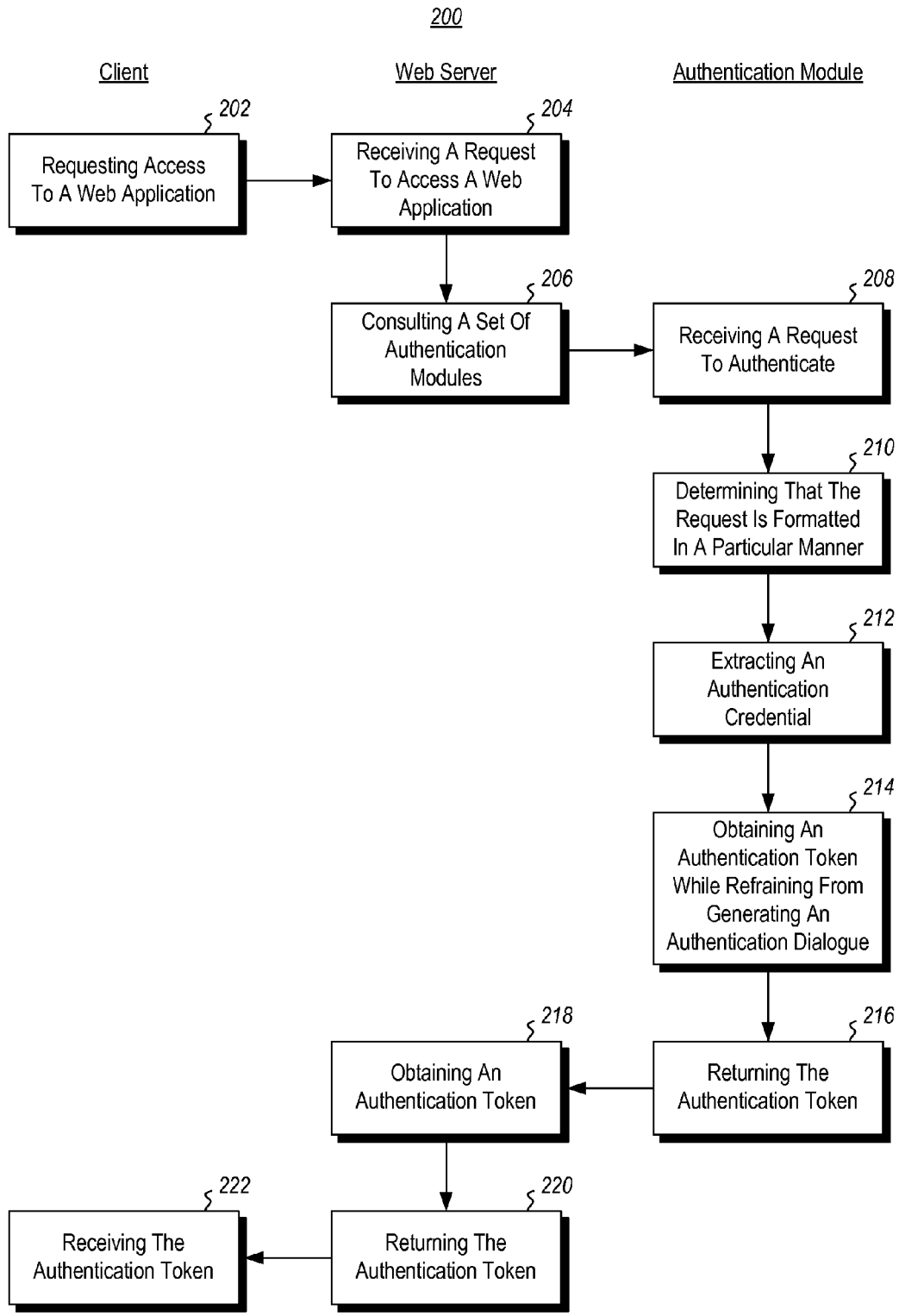
FIG. 2 illustrates a flow chart of an example method for authenticating a user for testing purposes.

FIG. 2 illustrates a flow chart of an example method 200 for authenticating a user for testing purposes. Method 200 will be described with respect to the components and data of computer architecture 100. Method 200 includes acts performed at client 104, web server 110, and authentication module 116a.

Method 200 comprises an act 202 at client 104 of requesting access to a web application. For example, automated testing tool 114 can cause web browser 112 to send a request to web server 110 to authenticate to web application 108. Because automated testing tool 114 is authenticating for testing purposes, automated testing tool 114 can cause web browser 112 to send a request that is formatted in a particular manner so that it is handled by authentication module 116a, which authenticates requests without causing an authentication dialogue to be presented at web browser 112. For example, automated testing tool 114 can cause web browser 112 to send a request that includes a particular URL query string, particular cookie data, particular HTTP header data, etc. Automated testing tool 114 can cause web browser 112 to send a request that includes an authentication credential, such as a user credential.

Method 200 also comprises an act 204 at web server 102 of receiving a request to access a web application. Act 204 can include an act of the web server receiving a request from a client, the request including a particular authentication credential and being formatted in a particular manner for being handled by a particular authentication module that is registered with the web server, the particular authentication module being configured to obtain authentication tokens based on authentication credentials included in requests that are formatted in the particular manner, while refraining from requesting any interactive authentication dialogue. For example, web server 110 can receive the request that was described above in connection with act 202. As such, the request that is received can include a particular URL query string (e.g., variable or value), a particular cookie data, a particular HTTP header data, etc. that causes the request to be handled by authentication module 116a that is registered with web server 110. The request can include an authentication credential provided by automated testing tool 114 to web browser 112.

Method 200 also comprises an act 206 at web server 102 of consulting a set of authentication modules. Act 206 can include, based on the request, an act of the web server consulting a set of authentication modules that includes the particular authentication module, consulting the set of authentication modules including passing at least a portion of the request, including the particular authentication credential, to the particular authentication module. For example, web server 110 can pass at least a portion of the request to authentication module 116a, including passing a particular URL query string, particular cookie data, particular HTTP header data, etc. Web server 110 can pass at least the authentication credential to authentication module 116a. In some embodiments, web server 110 consults each authentication module in a priority order until an authentication module is able to successfully return an authentication token.

Method 200 also comprises an act 208 at authentication module 116a of receiving a request to authenticate. Act 208 can include an act of the particular authentication module at the web server receiving a request to authenticate, the request being formatted in a particular manner that triggers the particular authentication module as opposed to one or more other authentication modules at the web server. For example, authentication module 116a can receive the portion of the request (e.g., a particular URL query string, particular cookie data, or particular HTTP header data, including the authentication credential) from web server 110. Authentication module 116a may receive the portion of the request prior to any other authentication module being consulted by web server 110 (e.g., because authentication module 116a is first on a priority list), or authentication module 116a may receive the portion of the request of the request after one or more other authentication modules have been consulted by web server 110 (e.g., because the other authentication modules could not process the request).

Method 200 also comprises an act 210 at authentication module 116a of determining that the request is formatted in a particular manner. Act 210 can include an act of the particular authentication module determining that the request is formatted in the particular manner that triggers the particular authentication module. For example, authentication module 116a can identify that the portion of the request that was received from web server 110 includes a particular URL query string, particular cookie data, particular HTTP header data, etc. For example, authentication module 116a can identify that the portion of the request that was received from web server 110 includes the authentication credential.

Method 200 also comprises an act 212 at authentication module 116a of extracting an authentication credential. Act 212 can include, based on determining that the request is formatted in the particular manner that triggers the authentication module, an act of the particular authentication module extracting a particular authentication credential from the request. For example, authentication module 116a can extract the authentication credential from a URL query string, cookie data, HTTP header data, etc.

Method 200 also comprises an act 214 at authentication module 116a of obtaining an authentication token while refraining from generating an authentication dialogue. Act 214 can include, based on the particular authentication credential that was extracted from the request, an act of the particular authentication module obtaining a particular authentication token from an identity provider, while refraining from generating any interactive authentication dialogue. For example, authentication module 116a can consult identity provider 118 to verify the particular authentication credential and to obtain an authentication token if the particular authentication credential is valid. Consulting identity provider 118 can include consulting a directory service, comparing the authentication credential against a database, etc.

If authentication module 116a is unable to obtain an authentication token from identity provider 118, authentication module 116a can communicate such information to web server 110. For example, authentication module 116a may route an error message from identity provider 118 to web server 110, return a false result, etc. When authentication module 116a is unable to obtain an authentication token from identity provider 118, web server 110 may attempt to authenticate the request against a different authentication module.

Method 200 also comprises an act 216 at authentication module 116a of returning the authentication token. Act 216 can include an act of the particular authentication module returning the particular authentication token. For example, authentication module 116a can return to web server 110 the authentication token that was obtained from identity provider 118.

Method 200 also comprises an act 208 at web server 110 of obtaining an authentication token (act 218). Act 218 can include, based on consulting the set of authentication modules, an act of the web server obtaining a particular authentication token from the particular authentication module. For example, web server 110 can receive the particular authentication token that was returned by authentication module 116a.

Method 200 also comprises an act 220 at web server 110 of returning the authentication token. Act 220 can include an act of the web server returning the particular authentication token to the client. For example, web server 110 can generate a response that is sent to client 104. The response can include the particular authentication token.

Method 200 also comprises an act 222 at client 104 of receiving the authentication token. For example, client 104 can receive the request that was sent by web server 110 in act 220.

As such, the embodiments described herein include triggering a web server authentication module that obtains authentication tokens based on user credentials, while refraining from generating any interactive authentication dialogue. Some embodiments can facilitate automated authentication during testing of web application code that is intended for deployment, while eliminating the need for authentication-related back doors.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media includes recordable-type storage devices, such as RAM, ROM, EEPROM, solid state drives ("SSDs"), flash memory, phase-change memory ("PCM"), optical disk storage, magnetic disk storage or other magnetic storage devices, or any other physical medium which can be used to store program code in the form of computer-executable instructions or data structures, and which can be accessed by a general-purpose or special-purpose computer system.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for authenticating a user of an automated testing tool when using the testing tool to test a web application at a web server, the computer implemented method comprising act of:

instantiating an automated testing tool for testing a web application at a web server;

registering at said web server a plurality of authentication modules, at least one of said authentication modules configured to obtain authentication tokens based on authenticating a request that includes formatting specific to said at least one authentication module;

receiving at said web server a request that i) includes an authentication credential of a user of said automated testing tool and ii) is formatted in a way specific to said at least one authentication module;

based on the request, the web server consulting said authentication modules registered at the web server until said at least one authentication module configured to obtain authentication tokens based on authenticating said request that is formatted in a way specific to said at least one authentication module is identified, and then passing at least a portion of said request, including the authentication credential, to the identified authentication module;

said identified authentication module authenticating said request based on said authentication credential and obtaining an authentication token without establishing any authentication dialogue with said user of the automated testing tool from which said request was sent; and the web server returning the particular authentication token to said user of the automated testing tool to permit access to the web application for testing purposes.

2. The method as recited in claim 1, wherein obtaining said authentication token is obtained from an identity provider based on sending said authentication credential to a directory service.

3. The method as recited in claim 1, wherein said request is formatted to include a Uniform Resource Locator (URL) that includes one or more of a particular variable or a particular value in a query string.

4. The method as recited in claim 3, wherein the URL includes said authentication credential.

5. The method as recited in claim 1, wherein said request is formatted to include at least a portion of a cookie.

6. The method as recited in claim 5, wherein the at least a portion of the cookie includes said authentication credential.

7. The method as recited in claim 1, wherein said request is formatted to include a Hypertext Transport Protocol (HTTP) header.

8. The method as recited in claim 7, wherein said HTTP header includes said authentication credential.

9. The method as recited in claim 1, wherein consulting said authentication modules comprises searching for said at least one authentication module according to a priority order of the plurality of authentication modules registered at the web server.

10. The method as recited in claim 1, wherein receiving the request at said web server comprises receiving the request from a web browser that is controlled by the automated testing tool.

11. The method as recited in claim 1, wherein said authentication token identifies said authentication credential.

12. A computer program product comprising one or more computer storage devices containing computer-executable instructions which, when implemented by one or more processors, cause the one or more processors to implement a method for authenticating a user of an automated testing tool when using the testing tool to test a web application at a web server, the computer implemented method comprising acts of:

instantiating an automated testing tool for testing a web application at a web server;

registering at said web server a plurality of authentication modules, at least one of said authentication modules configured to obtain authentication tokens based on authenticating a request that includes formatting specific to said at least one authentication module;

receiving at said web server a request that i) includes an authentication credential of a user of said automated testing tool and ii) is formatted in a way specific to said at least one authentication module;

based on the request, the web server consulting said authentication modules registered at the web server until said at least one authentication module configured to obtain authentication tokens based on authenticating said request that is formatted in a way specific to said at least one authentication module is identified, and then passing at least a portion of said request, including the authentication credential, to the identified authentication module;

said identified authentication module authenticating said request based on said authentication credential and obtaining an authentication token without establishing any authentication dialogue with said user of the automated testing tool from which said request was sent; and the web server returning the authentication token to said user of the automated testing tool to permit access to the web application for testing purposes.

13. The computer program product as recited in claim 12, wherein the request includes at least a portion of a Uniform Resource Locator that includes said authentication credential.

14. The computer program product as recited in claim 12, wherein the request includes at least a portion of a cookie that includes said authentication credential.

15. The computer program product as recited in claim 12, wherein the request includes at least a portion of a Hypertext Transport Protocol header that includes said authentication credential.

16. The computer program product as recited in claim 12, wherein obtaining said authentication token is obtained from an identity provider based on sending said authentication credential to a directory service.

17. The computer program product as recited in claim 12, wherein obtaining said authentication token is obtained from an identity provider by comparing said authentication credential against a database.

18. The computer program product as recited in claim 12, wherein receiving the request at said web server comprises receiving the request from a web browser that is controlled by the automated testing tool.

19. The computer program product as recited in claim 12, wherein said authentication token identifies said authentication credential.

20. A computer system, comprising:

one or more processors;

system memory; and one or more computer storage devices containing computer-executable instructions which, when implemented by one or more processors, cause the one or more processors to implement a method for authenticating a user of an automated testing tool when using the testing tool to test a web application at a web server, the computer implemented method comprising acts of:

instantiating an automated testing tool for testing a web application at a web server;

registering at said web server a plurality of authentication modules, at least one of said authentication modules configured to obtain authentication tokens based on authenticating a request that includes formatting specific to said at least one authentication module;

receiving at said web server a request that i) includes an authentication credential of a user of said automated testing tool and ii) is formatted in a way specific to said at least one authentication module;

based on the request, the web server consulting said authentication modules registered at the web server until said at least one authentication module configured to obtain authentication tokens based on authenticating said request that is formatted in a way specific to said at least one authentication module is identified, and then passing at least a portion of said request, including the authentication credential, to the identified authentication module;

said identified authentication module authenticating said request based on said authentication credential and obtaining an authentication token without establishing any authentication dialogue with said user of the automated testing tool from which said request was sent; and the web server returning the authentication token to said user of the automated testing tool to permit access to the web application for testing purposes.

* * * * *